(12) United States Patent
Tsuo

(10) Patent No.: US 7,515,402 B2
(45) Date of Patent: Apr. 7, 2009

(54) LIQUID CRYSTAL DISPLAY AND SUPPORT THEREOF

(75) Inventor: Chun-Jung Tsuo, Taoyuan (TW)

(73) Assignee: Qisda Corporation, Taoyuan County (TW)

( * ) Notice: Subject to any disclaimer, the term of this patent is extended or adjusted under 35 U.S.C. 154(b) by 478 days.

(21) Appl. No.: 11/329,683

(22) Filed: Jan. 10, 2006

(65) Prior Publication Data

US 2006/0158578 A1 Jul. 20, 2006

(30) Foreign Application Priority Data

Jan. 14, 2005 (TW) .............................. 94101127 A

(51) Int. Cl.
*G06F 1/16* (2006.01)
(52) U.S. Cl. .......................... 361/681; 361/682; 349/58
(58) Field of Classification Search ................. 361/681, 361/682; 349/58
See application file for complete search history.

(56) References Cited

U.S. PATENT DOCUMENTS 6,381,125 B1 * 4/2002 Mizoguchi et al. .......... 361/682
6,905,099 B2 * 6/2005 Sung ........................... 248/146
7,274,555 B2 * 9/2007 Kim et al. .................... 361/681

FOREIGN PATENT DOCUMENTS

CN 1499534 5/2004
TW I224927 B 12/2004

* cited by examiner

*Primary Examiner*—Lisa Lea-Edmonds
*Assistant Examiner*—Ingrid Wright

(57) ABSTRACT

A liquid crystal display. A moving assembly is connected to a display panel to move the display panel. A locking assembly is moveable between a first position and a second position. When the locking assembly is located in the first position, the display panel cannot be moved. When the locking assembly is located in the second position, the display panel can be moved by the moving assembly. A holding assembly is moveable between a third position and a fourth position. When the holding assembly is located in the third position, the locking assembly is kept at the first position. When the holding assembly is located in the fourth position, the locking assembly can be moved to the second position.

20 Claims, 7 Drawing Sheets

LIQUID CRYSTAL DISPLAY AND SUPPORT THEREOF

BACKGROUND

The invention relates to a liquid crystal display, and in particular, to a liquid crystal display with an adjustable support collapsible for travel.

A liquid crystal display normally includes a support with height adjustable based on user requirement.

Typically, a conventional liquid crystal display support is not collapsible, and further cannot remain collapsed during transport. When the liquid crystal display is transported, its volume increases since the support cannot remain in a collapsed state, maintaining the minimum obtainable height. Thus, transporting the display may be inconvenient.

In view of this, a liquid crystal display with an adjustable support providing the capability to remain in a collapsed state has been developed. Typically, however, a provided button, which when pressed causes the support to collapse, does not have a safety feature which prevents the display from expanding if accidentally pressed during transport.

SUMMARY

Liquid crystal displays are provided. An exemplary embodiment of a liquid crystal display comprises a display panel, a moving assembly, a locking assembly, and a holding assembly. The moving assembly is connected to the display panel to move the display panel. The locking assembly is moveable between a first position and a second position. When the locking assembly is located in the first position, the moving assembly is abutted by the locking assembly so that the display panel cannot be moved. When the locking assembly is located in the second position, the moving assembly is not abutted by the locking assembly so that the display panel can be moved by the moving assembly. The holding assembly is moveable between a third position and a fourth position. When the holding assembly is located in the third position, the holding assembly engages the locking assembly so that the locking assembly is held at the first position. When the holding assembly is located in the fourth position, the locking assembly disengages from the holding assembly so that the locking assembly can be moved to the second position.

Furthermore, the holding assembly comprises a holding member and a first elastic member. The holding member comprises a protrusion. The locking assembly comprises a notch corresponding to the protrusion. When the holding member is located in the third position, the protrusion is located in the notch so that the holding member engages the locking assembly. The first elastic member may be a compression spring, and connects the holding member to keep the holding member at the third position.

Moreover, the liquid crystal display comprises a base. The holding member comprises a protrusion exposed by the base. The moving assembly comprises a housing and a moving member. The housing is disposed on the base, and abuts one end of the first elastic member. The moving member is disposed in the housing to be moveable between a fifth position and a sixth position. When the moving member is located in the sixth position and the locking assembly is located in the first position, the moving member engages the locking assembly. When the moving member is located in the fifth position and the locking assembly is located in the first position, the moving member disengages from the locking assembly.

Additionally, the locking assembly comprises a locking member and a second elastic member. The locking member comprises a first hook with a first tapered surface at a side facing the moving assembly, and is moveable between the first position and the second position. The second elastic member may be a compression spring, and is disposed on the locking member to return the locking member to the first position. The moving member comprises a second hook with a second tapered surface at a side facing the locking assembly. When the moving member is located in the sixth position and the locking member is located at the first position, the second hook engages the first hook.

Bases for elevating or lowering a device are provided. An exemplary embodiment of a base comprises a moving assembly, a locking assembly, and a holding assembly. The moving assembly is connected to the device to move the device. The locking assembly is moveable between a first position and a second position. When the locking assembly is located in the first position, the moving assembly is abutted by the locking assembly so that the device cannot be moved. When the locking assembly is located in the second position, the moving assembly is not abutted by the locking assembly so that the device can be moved by the moving assembly. The holding assembly is moveable between a third position and a fourth position. When the holding assembly is located in the third position, the holding assembly engages the locking assembly so that the locking assembly is held at the first position. When the holding assembly is located in the fourth position, the locking assembly disengages from the holding assembly so that the locking assembly can be moved to the second position.

DESCRIPTION OF THE DRAWINGS

The invention can be more fully understood by reading the subsequent detailed description and examples with references made to the accompanying drawings, wherein:

FIG. 1b is a partial rear view of the liquid crystal display of FIG. 1a;

FIG. 2 is a partial exploded view of the liquid crystal display of FIG. 1a;

DETAILED DESCRIPTION

Figure 1A:
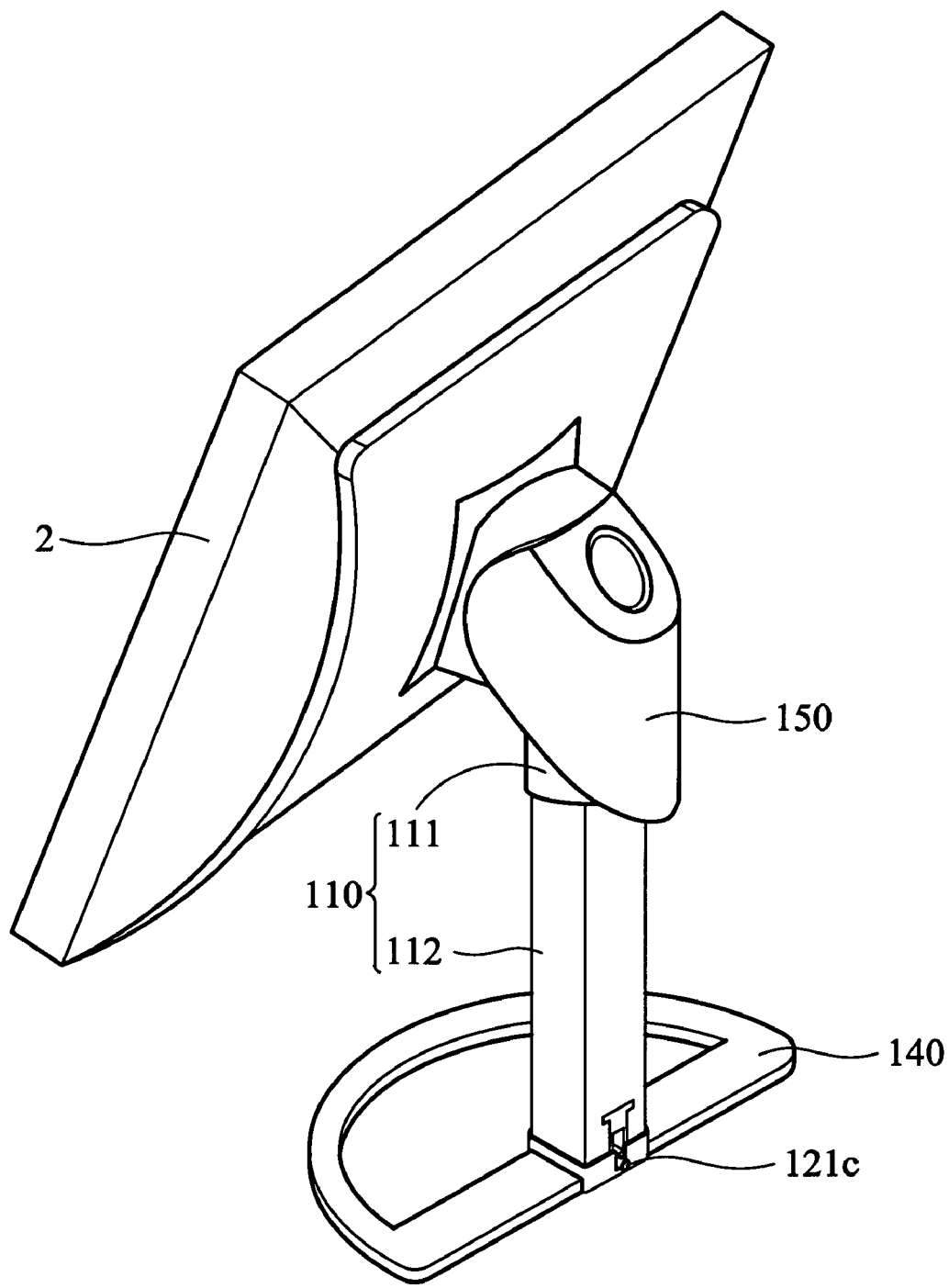
FIG. 1a is a schematic view of an embodiment of a liquid crystal display.
Figure 1B:
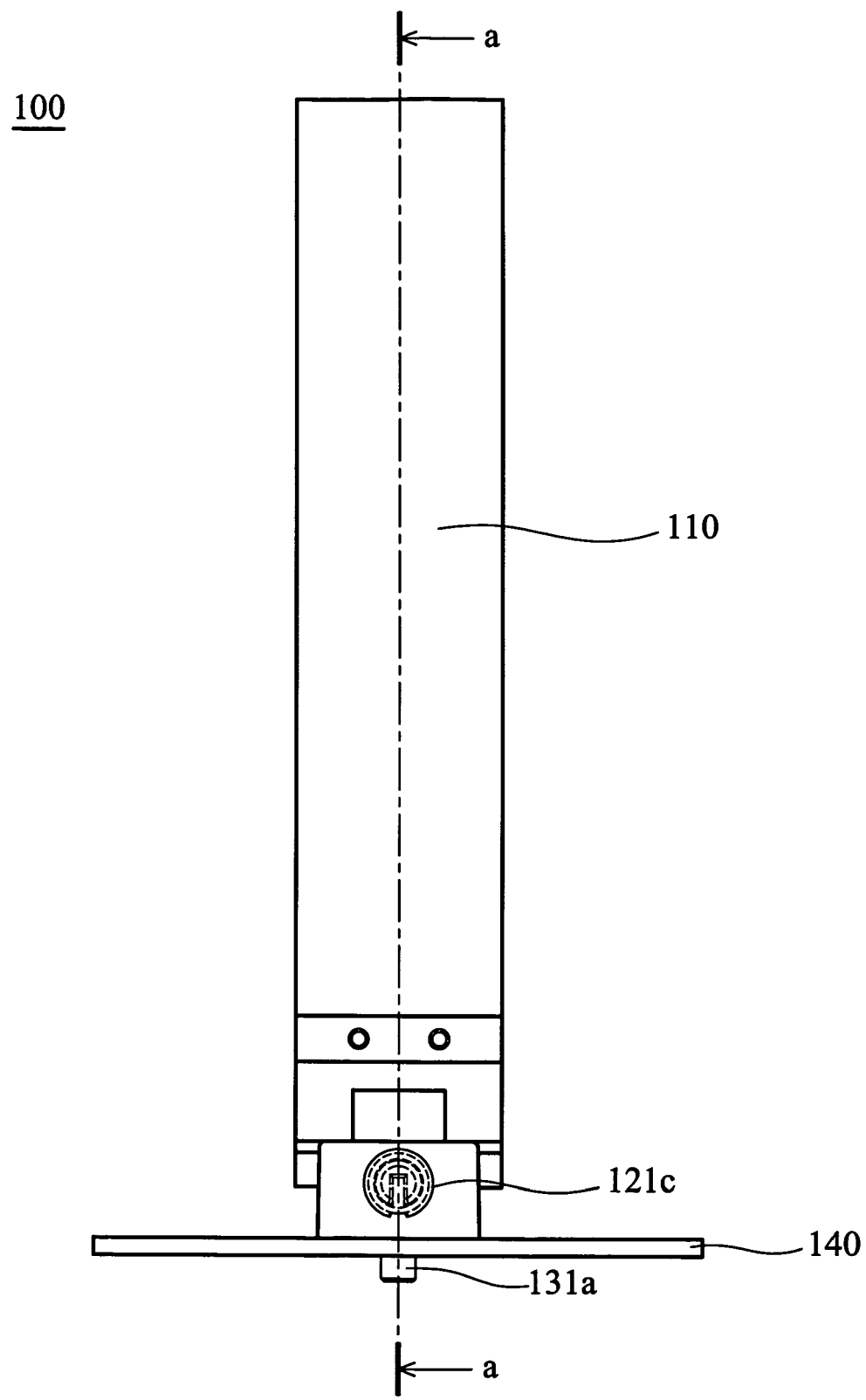

FIGS. 1a and 1b depict an embodiment of a liquid crystal display 1 comprising a display panel 2, a support 100, and an intermediate portion 150. The display panel 2 is used as a display unit of the liquid crystal display 1. Since the structure of the display panel 2 follows the conventional structure, its description is omitted.

Figure 2:
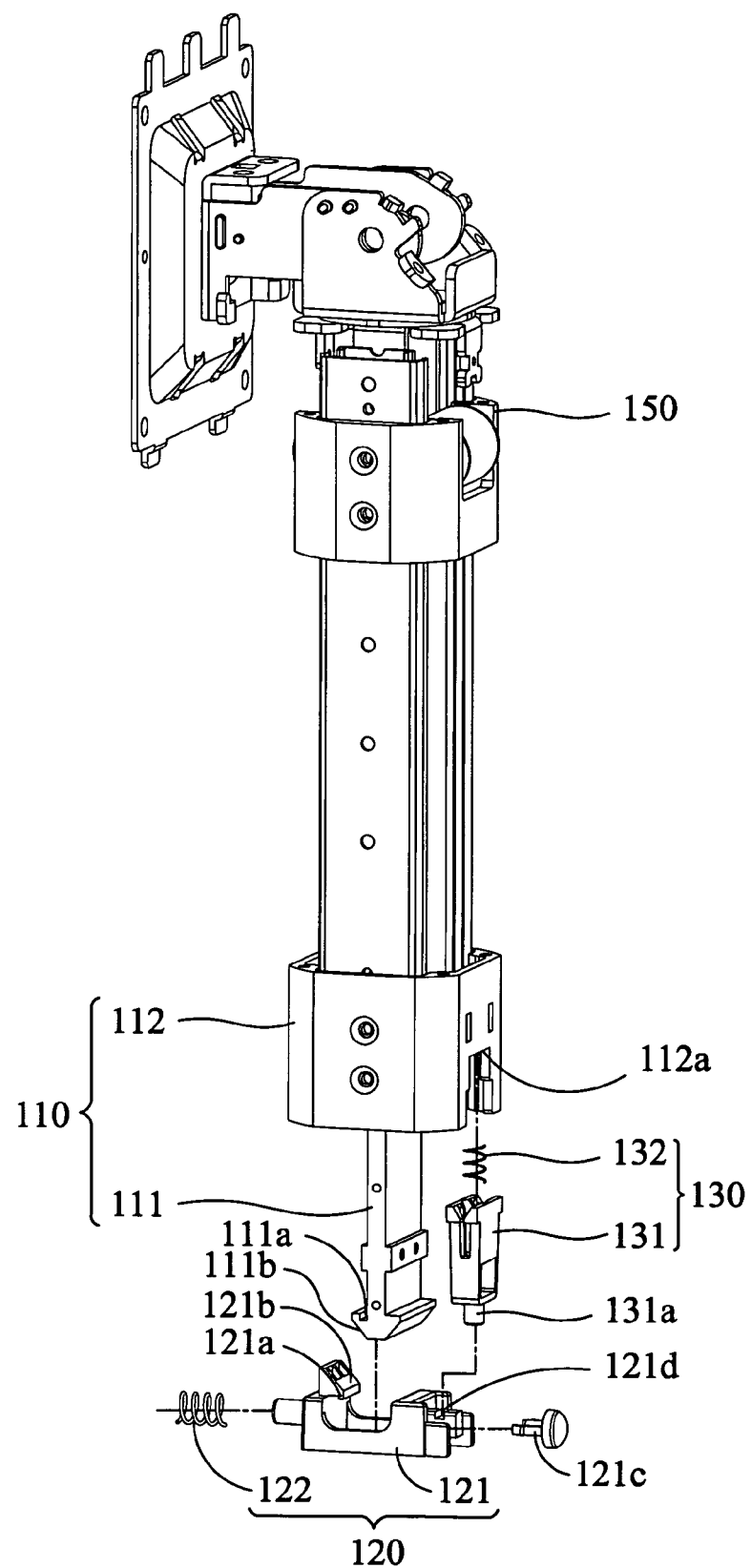

Referring to FIGS. 1b and 2, the support 100 comprises a moving assembly 110, a locking assembly 120, a holding assembly 130, and a base 140. The support 100 is a bottom of the liquid crystal display 1, and adjusts the height of the display panel 2 in a direction perpendicular to the base 140.

The moving assembly 110 is connected to the display panel 2 via the intermediate portion 150 to elevate or lower the display panel 2. As shown in FIG. 2, the moving assembly 110 comprises a housing 112 and a moving member 111. The housing 112 is disposed on the base 140, and comprises an abutment surface 112a to abut one end of a first elastic member 132 of the holding assembly 130. The moving member 111 is disposed in the housing 112 to be moveable between a separated position (shown in FIG. 4b and hereinafter referred to as a fifth position) and an engaging position (shown in FIG. 4a and hereinafter referred to as a sixth position). Furthermore, the moving member 111 comprises a second hook 111a with a second tapered surface 111b at a side facing the locking assembly 120. Additionally, the moving assembly 110 further comprises guide rails and other components (not shown) in the housing 112 to assist in the movement of the moving member 111. Since the structure of such components follows the conventional structure, its description is omitted.

Figure 4A:
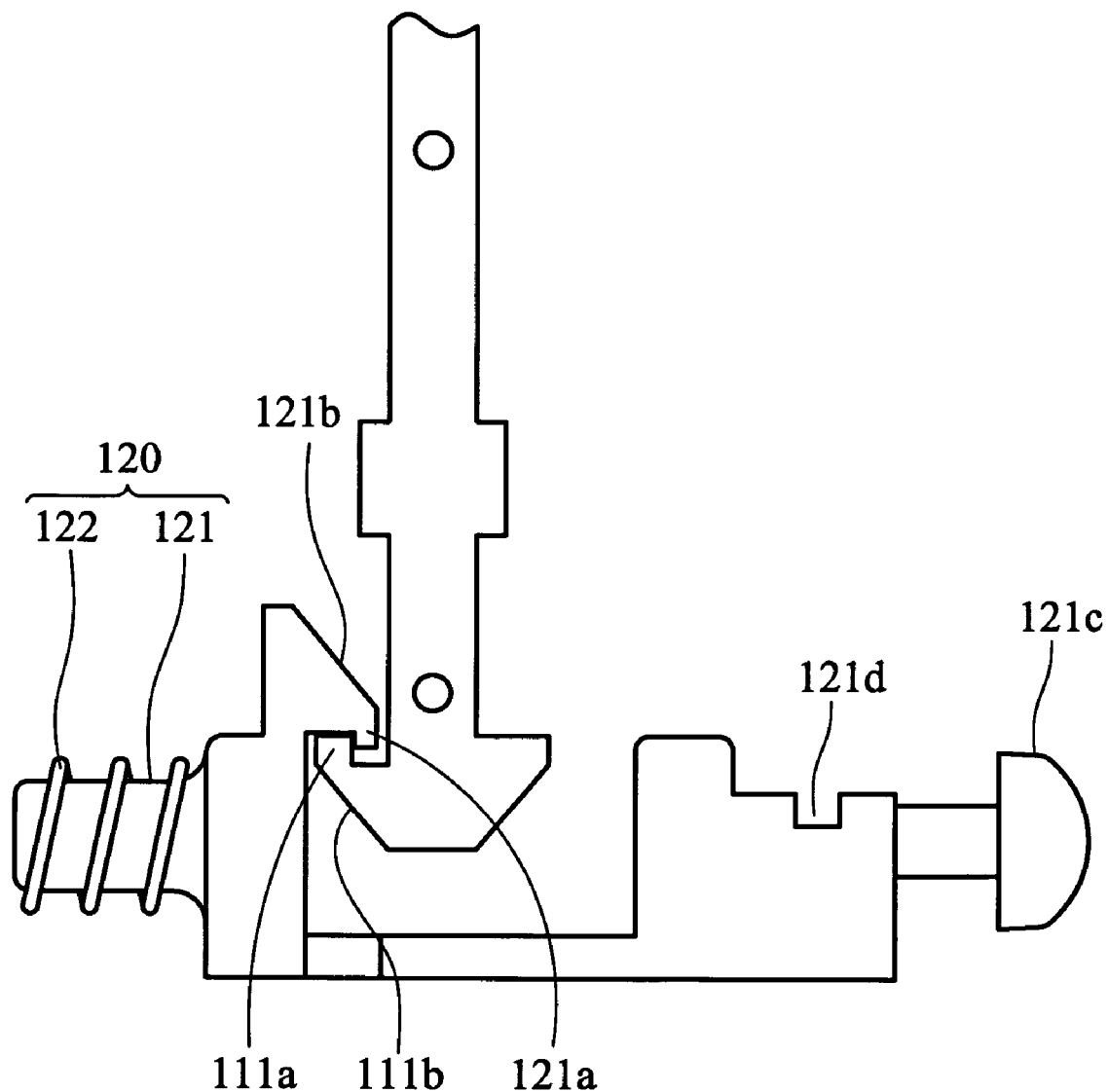
FIG. 4a is a schematic view of a moving assembly and a locking assembly in FIG. 2, wherein the moving assembly is located in a sixth position and the locking assembly is located in a first position.
Figure 4B:
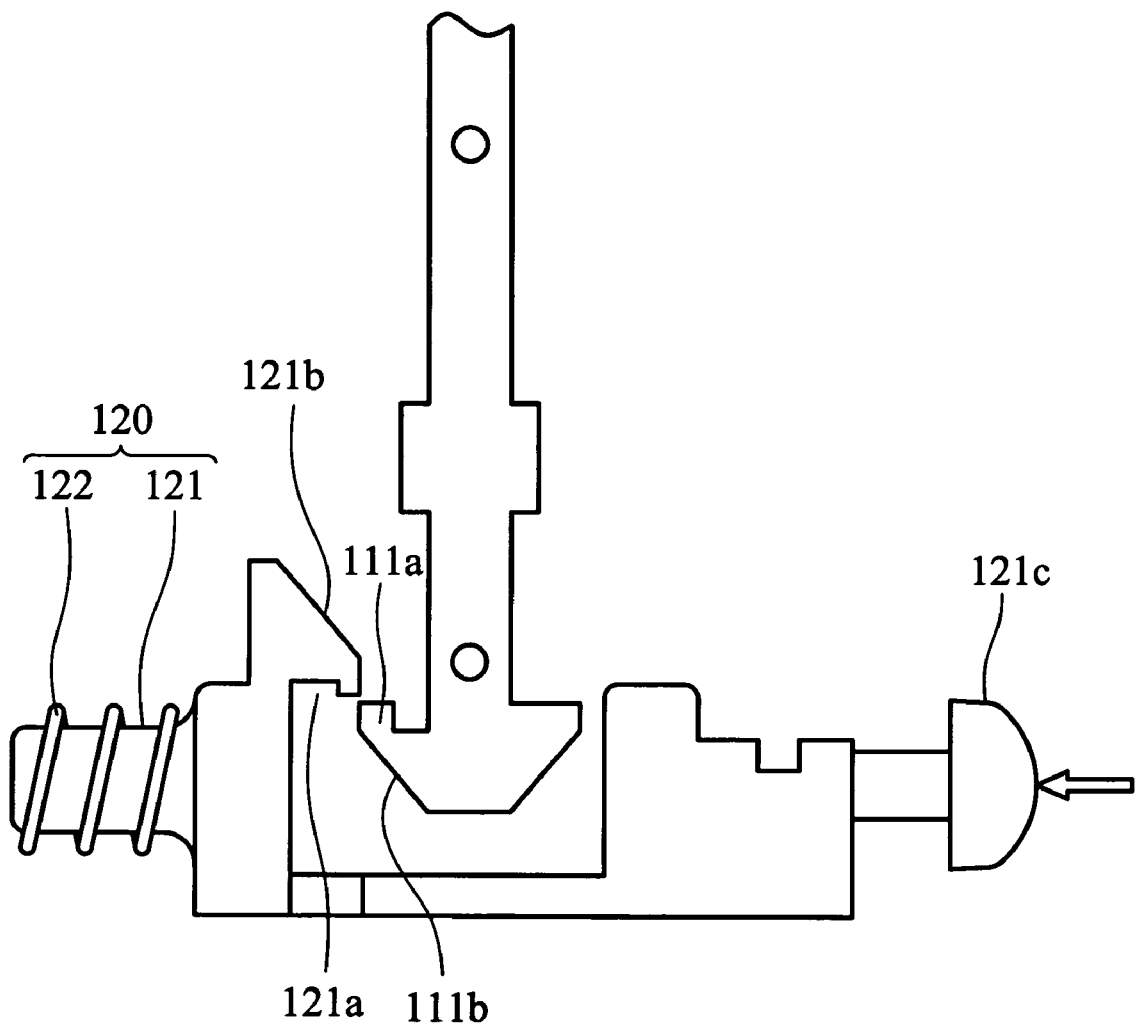
FIG. 4b is another schematic view of another embodiment of the moving assembly and the locking assembly in FIG. 2, wherein the moving assembly is located in a fifth position and the locking assembly is located in a second position.

The locking assembly 120 is moveable between an idle position (shown in FIG. 4a and hereinafter referred to as a first position) and an opening position (shown in FIG. 4b and hereinafter referred to as a second position). As shown in FIG. 2, the locking assembly 120 comprises a locking member 121 and a second elastic member 122. As shown in FIG. 1a, the locking member 121 comprises an end portion 121c, exposed by housing 112 of the moving assembly 110, to be conveniently pressed so that the locking member 121 can be moveable between the first position and the second position. Furthermore, the locking member 121c comprises a first hook 121a with a first tapered surface 121b at a side facing the moving assembly 110. Additionally, the locking member 121 comprises a notch 121d at a surface facing the holding assembly 130.

The second elastic member 122 may be a compression spring, and is connected to another end portion (not labeled) of the locking member 121 to return the locking member 121 to the first position.

The holding assembly 130 is moveable between a locking position (shown in FIG. 3a and hereinafter referred to as a third position) and a release position (shown in FIG. 3b and hereinafter referred to as a fourth position) to prevent the locking assembly 120 from accidentally being pressed. As shown in FIG. 2, the holding assembly 130 comprises a holding member 131 and a first elastic member 132. The holding member 131 comprises a first protrusion 131a exposed by the base 140, and a second protrusion 131b corresponding to the notch 121d of the locking member 121 of the locking assembly 120. The first elastic member 132 may be a compression spring, with one end thereof connected to the holding member 131. The other end of the first elastic member 131 abuts the abutment surface 112a of the housing 112 of the moving assembly 110 to keep the holding member 131 at the third position.

Figure 3A:
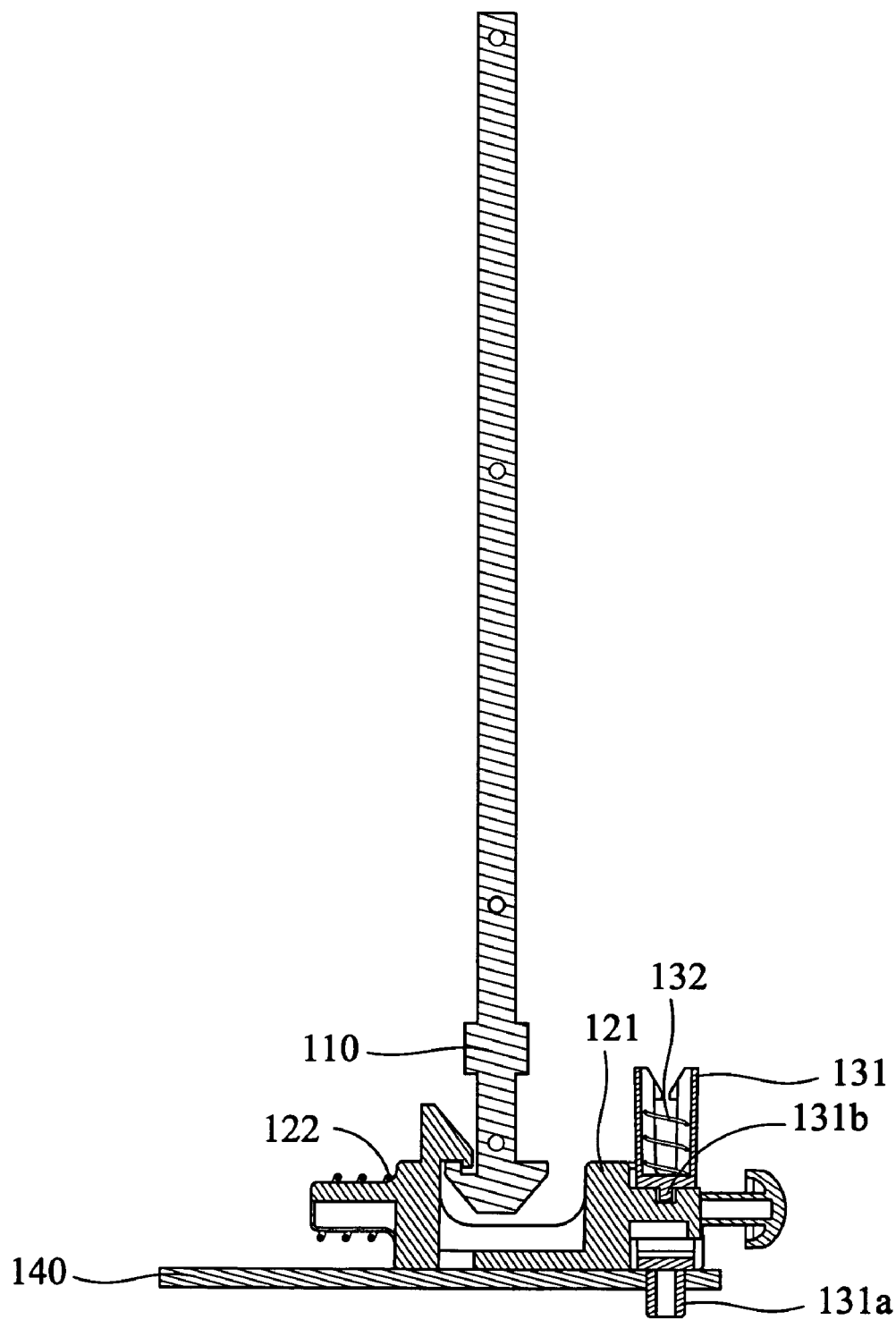
FIG. 3a is a cross section along a line a-a in FIG. 1b, wherein a holding assembly is located in a third position.
Figure 3B:
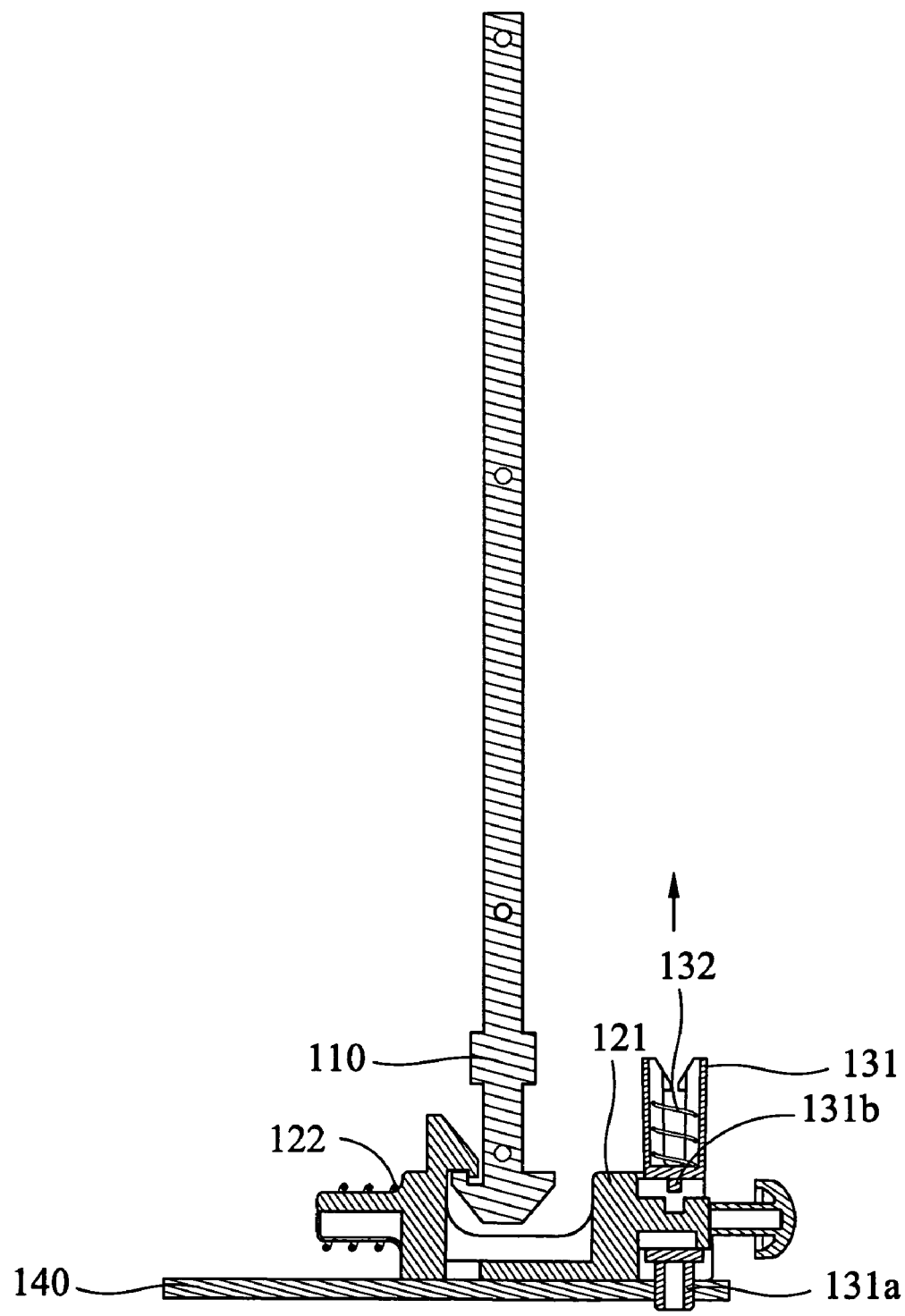
FIG. 3b is another cross section along a line a-a in FIG. 1b, wherein the holding assembly is located in a fourth position.

When the liquid crystal display 1 is not placed on a flat surface such as a table, the holding assembly 130 is located in the third position as shown in FIG. 3a since the first protrusion 131a of the holding member 131 is not pressed. At this time, the second protrusion 131b of the holding member 131 is located in the notch 121d of the locking member 121 so that the holding member 131 engages the locking assembly 120. As a result, the locking assembly 120 cannot be moved to be kept at the first position, thus avoiding being accidentally pressed. Conversely, when the liquid crystal display 1 is placed on a flat surface such as a table, the holding assembly 130 is located in the fourth position as shown in FIG. 3b since the first protrusion 131a of the holding member 131 is pressed. At this time, the second protrusion 131b of the holding member 131 is not located in the notch 121d of the locking member 121 so that the locking assembly 120 can be freely moved to the second position.

Additionally, to elevate or lower the display panel 2, the position of the moving assembly 110 must be considered when the locking assembly 120 can be freely moveable between the first position and the second position. Specifically, when the moving assembly 110 is located in the sixth position, the moving assembly 110 abuts the locking assembly 120 as shown in FIG. 4a so that the locking assembly 120 cannot be moved to second position. At this time, the display panel 2 cannot be moved. Conversely, when the moving assembly 110 is located in the fifth position, the locking assembly 120 can be moved to second position as shown in FIG. 4b so that the display panel 2 can be elevated or lowered by the moving assembly 110.

As previously described, since the inventive support comprises the holding assembly, the liquid crystal display can remain in the original state even if the end portion of the locking member is accidentally pressed, thus enhancing reliability.

While the invention has been described by way of example and in terms of preferred embodiment, it is to be understood that the invention is not limited thereto. To the contrary, it is intended to cover various modifications and similar arrangements (as would be apparent to those skilled in the art) Therefore, the scope of the appended claims should be accorded the broadest interpretation so as to encompass all such modifications and similar arrangements.

What is claimed is:

1. A liquid crystal display, placed on a working surface, comprising:
    a display panel;
    a moving assembly connected to the display panel to move the display panel;
    a locking assembly moveable between a first position and a second position, wherein the moving assembly is abutted by the locking assembly so that the display panel cannot be moved when the locking assembly is located in the first position, and the moving assembly is not abutted by the locking assembly so that the display panel can be moved by the moving assembly when the locking assembly is located in the second position; and
    a holding assembly moveable between a third position and a fourth position, wherein the holding assembly is in the fourth position when the holding assembly contacts the working surface, and the holding assembly is in the third position when the holding assembly is separated from the working surface, wherein the holding assembly engages the locking assembly so that the locking assembly is held at the first position when the holding assembly is located in the third position, and the locking assembly disengages from the holding assembly so that the locking assembly can be moved to the second position when the holding assembly is located in the fourth position.

2. The liquid crystal display as claimed in claim 1, wherein the holding assembly comprises:
    a holding member engaging the locking assembly when the holding member is located in the third position; and
    a first elastic member connecting the holding member to keep the holding member at the third position.

3. The liquid crystal display as claimed in claim 2, wherein the holding member comprises a protrusion, the locking assembly comprises a notch corresponding to the protrusion, and the protrusion is located in the notch when the holding assembly is located in the third position.

4. The liquid crystal display as claimed in claim 2, wherein the first elastic member is a compression spring.

5. The liquid crystal display as claimed in claim 2, further comprising a base, wherein the holding member comprises a protrusion exposed by the base.

6. The liquid crystal display as claimed in claim 5, wherein the moving assembly comprises:
   a housing disposed on the base; and
   a moving member disposed in the housing to be moveable between a fifth position and a sixth position, wherein the moving member engages the locking assembly when the moving member is located in the sixth position and the locking assembly is located in the first position, and the moving member disengages from the locking assembly when the moving member is located in the fifth position and the locking assembly is located in the first position.

7. The liquid crystal display as claimed in claim 6, wherein one end of the first elastic member abuts the housing.

8. The liquid crystal display as claimed in claim 6, wherein the locking assembly comprises:
   a locking member moveable between the first position and the second position; and
   a second elastic member disposed on the locking member to return the locking member to the first position.

9. The liquid crystal display as claimed in claim 8, wherein the locking member comprises a first hook, and the moving member comprises a second hook engaging the first hook when the moving member is located in the sixth position and the locking member is located in the first position.

10. The liquid crystal display as claimed in claim 9, wherein the first hook comprises a first tapered surface at a side facing the moving assembly, and the second hook comprises a second tapered surface at a side facing the locking assembly.

11. The liquid crystal display as claimed in claim 8, wherein the second elastic member is a compression spring.

12. A support for elevating or lowering a device, placed on a working surface, comprising:
   a moving assembly connected to the device to move the device;
   a locking assembly moveable between a first position and a second position, wherein the moving assembly is abutted by the locking assembly so that the device cannot be moved when the locking assembly is located in the first position, and the moving assembly is not abutted by the locking assembly so that the device can be moved by the moving assembly when the locking assembly is located in the second position; and
   a holding assembly moveable between a third position and a fourth position, wherein the holding assembly is in the fourth position when the holding assembly contacts the working surface, and the holding assembly is in the third position when the holding assembly is separated from the working surface, wherein the holding assembly engages the locking assembly so that the locking assembly is held at the first position when the holding assembly is located in the third position, and the locking assembly disengages from the holding assembly so that the locking assembly can be moved to the second position when the holding assembly is located in the fourth position.

13. The support as claimed in claim 12, wherein the holding assembly comprises:
   a holding member engaging the locking assembly when the holding member is located in the third position; and
   a first elastic member connecting the holding member to keep the holding member at the third position.

14. The support as claimed in claim 13, wherein the holding member comprises a protrusion, the locking assembly comprises a notch corresponding to the protrusion, and the protrusion is located in the notch when the holding assembly is located in the third position.

15. The support as claimed in claim 13, further comprising a base, wherein the holding member comprises a protrusion exposed by the base.

16. The support as claimed in claim 15, wherein the moving assembly comprises:
   a housing disposed on the base; and
   a moving member disposed in the housing to be moveable between a fifth position and a sixth position, wherein the moving member engages the locking assembly when the moving member is located in the sixth position and the locking assembly is located in the first position, and the moving member disengages from the locking assembly when the moving member is located in the fifth position and the locking assembly is located in the first position.

17. The support as claimed in claim 16, wherein one end of the first elastic member abuts the housing.

18. The support as claimed in claim 17, wherein the locking assembly comprises:
   a locking member moveable between the first position and the second position; and
   a second elastic member disposed on the locking member to return the locking member to the first position.

19. The support as claimed in claim 18, wherein the locking member comprises a first hook, and the moving member comprises a second hook engaging the first hook when the moving member is located in the sixth position and the locking member is located in the first position.

20. The support as claimed in claim 19, wherein the first hook comprises a first tapered surface at a side facing the moving assembly, and the second hook comprises a second tapered surface at a side facing the locking assembly.

* * * * *